US012576785B2

(12) United States Patent
Ambrosetti et al.

(10) Patent No.: US 12,576,785 B2
(45) Date of Patent: Mar. 17, 2026

(54) METHOD FOR REPRESENTING SURROUNDINGS OF A VEHICLE

(71) Applicant: AUDI AG, Ingolstadt (DE)

(72) Inventors: Sebastien Ambrosetti, Waidhofen (DE); Sabrina Roters, Gaimersheim (DE); Lydia Schindhelm, Ingolstadt (DE); Rebekka Neumann, Gaimersheim-Lippertshofen (DE); Tobias Hopf, Landshut (DE); Timo Schaschek, Ingolstadt (DE); Benjamin Berndt, Nuremberg (DE); Alexander Khlebnikov, Fürth (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/841,261

(22) PCT Filed: Feb. 1, 2023

(86) PCT No.: PCT/EP2023/052483
§ 371 (c)(1),
(2) Date: Aug. 23, 2024

(87) PCT Pub. No.: WO2023/165775
PCT Pub. Date: Sep. 7, 2023

(65) Prior Publication Data
US 2025/0162505 A1      May 22, 2025

(30) Foreign Application Priority Data
Mar. 4, 2022      (DE) ..................... 10 2022 105 187.0

(51) Int. Cl.
*B60R 1/27*          (2022.01)
*G06F 3/147*         (2006.01)
(Continued)

(52) U.S. Cl.
CPC ................ *B60R 1/27* (2022.01); *G06F 3/147* (2013.01); *G06V 10/764* (2022.01); *G06V 20/58* (2022.01); *G08G 1/16* (2013.01); *B60R 2300/802* (2013.01)

(58) Field of Classification Search
CPC ..... B60R 1/27; B60R 2300/802; G06F 3/147; G06V 10/764; G06V 20/58; G08G 1/16;
(Continued)

(56) References Cited

U.S. PATENT DOCUMENTS 7,561,966 B2      7/2009  Nakamura et al.
7,898,434 B2      3/2011  Taniguchi et al.
(Continued)

FOREIGN PATENT DOCUMENTS

DE      102004060380 A1      7/2005
DE      102008028303 A1      1/2009
(Continued)

OTHER PUBLICATIONS

International Search Report of the International Searching Authority directed to related International Patent Application No. PCT/EP2023/052483, mailed May 8, 2023, with attached English-language translation; 5 pages.

*Primary Examiner* — James M Pontius
(74) *Attorney, Agent, or Firm* — Sterne, Kessler, Goldstein & Fox P.L.L.C.

(57) ABSTRACT

An approach is described for representing surroundings of a vehicle, the vehicle being in a specific driving situation, on at least one display panel of the vehicle, wherein the surroundings are captured by at least one exterior camera of the vehicle, wherein a check is made to establish whether or not at least one object in the captured surroundings is relevant to the specific driving situation, wherein at least one object which is relevant to the specific driving situation is
(Continued)

classified as at least one primary object and at least one object which is irrelevant to the specific driving situation is classified as at least one secondary object, wherein the display panel is divided into at least one primary zone for the at least one primary object and at least one secondary zone for the at least one secondary object, wherein the at least one primary zone is depicted in real form and the at least one secondary zone is depicted in modified form by means of the at least one display panel.

11 Claims, 5 Drawing Sheets

(51) Int. Cl.
*G06V 10/764* (2022.01)
*G06V 20/58* (2022.01)
*G08G 1/16* (2006.01)

(58) Field of Classification Search
CPC . G06T 2207/10016; G06T 2207/30241; G06T 2207/30252; G06T 7/20; G06T 11/00
See application file for complete search history.

(56) References Cited

U.S. PATENT DOCUMENTS

| | | |
|---|---|---|
| 11,021,103 B2 | 6/2021 | Haar et al. |
| 11,766,971 B2 | 9/2023 | Weinlich et al. |
| 2020/0143569 A1* | 5/2020 | Masuya ................ G06T 11/001 |

FOREIGN PATENT DOCUMENTS

| | | | |
|---|---|---|---|
| DE | 102013016251 A1 | 6/2014 | |
| DE | 102015204745 A1 | 9/2016 | |
| DE | 102017210268 B3 | 8/2018 | |
| DE | 102017211244 B3 | 12/2018 | |
| DE | 102018209192 B3 | 5/2019 | |
| DE | 102020001572 A1 | 10/2020 | |

* cited by examiner

METHOD FOR REPRESENTING SURROUNDINGS OF A VEHICLE

TECHNICAL FIELD

The present disclosure relates to a method for depicting surroundings of a vehicle and to a display system.

A vehicle's interior architecture may feature a very large "pillar to pillar" display that should be positioned relatively high in front of the driver in order to be readable. However, the positioning of such a massive display can partially limit the view to the outside through a windshield.

BACKGROUND

Document DE 10 2017 210 268 B3 describes an apparatus for reproducing image data in a motor vehicle.

An apparatus and a method for reproducing data in augmented reality are known from document DE 10 2015 204 745 A1.

A display system of a motor vehicle is described in document DE 10 2008 028 303 A1.

Against this background, an object was to adequately depict surroundings of a vehicle on a display panel of the vehicle.

BRIEF DESCRIPTION OF THE DRAWINGS/FIGURES

The present disclosure is schematically illustrated in the drawing by means of embodiments and is described schematically and in detail with reference to the drawing.

DETAILED DESCRIPTION

Figure 1:
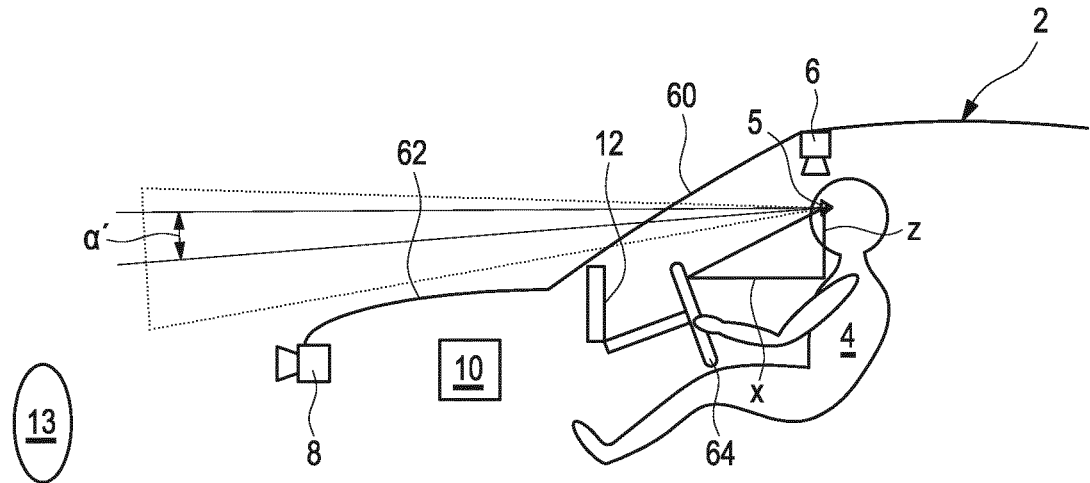
FIG. 1 is a schematic view of a first embodiment of the display system according to the present disclosure for carrying out a first embodiment of the method according to the present disclosure.
Figure 1:
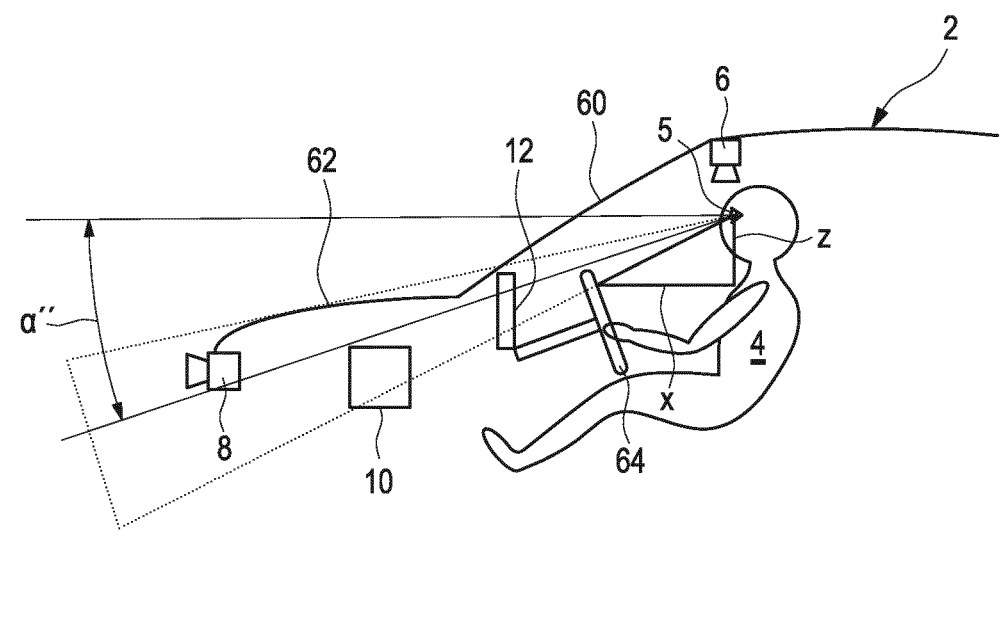

This object is achieved by a method and a display system having the features of the independent claims. Embodiments of the method and the display system can be found in the dependent claims and the description.

The method according to the present disclosure is provided for depicting surroundings or an environment of a vehicle, e.g. a motor vehicle, taking into account the fact that this vehicle is in a current and/or specific, e.g. particular, driving situation. The surroundings are captured in at least one spatial direction, e.g. forward, backward and/or sideways, by at least one exterior camera of the vehicle. In addition, a check is made to establish whether or not at least one primary object in the captured and thus imaged surroundings is significant and/or relevant for the specific driving situation. At least one object relevant to the specific driving situation is classified as at least one primary object, and at least one object not relevant or irrelevant to the specific driving situation is classified as at least one secondary object. In addition, the display panel and/or the surroundings is/are divided into at least one primary zone for the at least one primary object and/or with the at least one primary object located in the at least one primary zone, and at least one secondary zone for the at least one secondary object and/or with the at least one secondary object located in the at least one secondary zone. It is also provided that the at least one primary zone is depicted with, by and/or on the at least one display panel in real form, e.g. identical to reality, objective, natural and/or unadulterated, whereas the at least one secondary zone is depicted with, by and/or on the at least one display panel in a usually altered or modified form, e.g. manipulated, simplified, distorted and/or abstract or abstracted.

In one embodiment of the method, it is possible for the at least one primary zone having the at least one primary object to be depicted with, by and/or on the at least one display panel in an optically sharp and/or clear and thus easily recognizable manner. In contrast, the at least one secondary zone having the at least one secondary object is depicted with, by and/or on the at least one display panel in an optically fuzzy, unclear and/or blurred and thus unrecognizable manner. Typically, the at least one primary object which is relevant or important to the specific driving situation is depicted in real form and the at least one secondary object which is irrelevant or unimportant to the driving situation is depicted in modified form. If a particular secondary zone is to be displayed in a blurred manner, a filter, for example, is used to create a blur effect.

In one embodiment, the at least one primary object and/or an image or representation thereof is depicted in real and thus unadulterated form. In one embodiment, an optical effect is superimposed on the at least one secondary object within the at least one second zone, wherein it is, for example, depicted or displayed in a blurred and/or unrecognizable manner. If the at least one display panel can be switched to be transparent at least in some portions, optionally to be completely transparent, and is arranged at least partially in front of a window pane, e.g. a windshield, it is possible, among other things, for a driver, as an occupant of the vehicle, to view the surroundings and objects located therein through the window pane and the at least one display panel. In this case, the at least one display panel for the at least one primary zone is made transparent. In addition, the at least one display panel for the at least one secondary zone is provided with an optical effect for changing the at least one secondary zone, which is, for example, displayed therein, wherein the at least one secondary zone is optically changed.

Alternatively or additionally, it is possible that the at least one primary zone and thus the at least one primary object is or are depicted in true colors and thus in real colors. In contrast, colors and/or a color spectrum of the at least one secondary zone comprising the at least one secondary object are optically manipulated, changed, simplified and/or distorted. It is possible to depict the at least one secondary zone in an average color or mixed color or only in black and white. A real color in the at least one secondary zone is analyzed, for example, using an algorithm provided for this purpose, wherein the average color or an ambient color of the at least one secondary zone is also determined. In this case, it is possible to analyze the at least one secondary zone sequentially in individual color regions and to display these as a homogeneous background image for the at least one secondary object, e.g. in monochrome. It is possible to color the at least one secondary zone variably as a function of the specific driving situation.

In a possible embodiment, the at least one primary object is important and/or relevant to the current and/or specific driving situation if it influences the driving situation. In contrast, the at least one secondary object does not influence the current and/or specific driving situation, or at least not directly.

A roadway and/or a road on which the vehicle travels is generally required as a surface for the vehicle to travel. However, this is the case regardless of the specific and/or current driving situation, which is why the road or roadway is usually classified as a secondary object. An irregularity in the roadway, e.g. an obstacle located thereon, wherein this can be a construction site and/or an unevenness, e.g. a pothole, is classified as a primary object.

It is also possible for the surroundings recorded by the at least one exterior camera to be analyzed in terms of content, wherein a distinction is made between dynamic or moving objects on the one hand and static objects on the other hand. In this case, at least one dynamic object is classified as the at least one primary object and at least one static object is classified as the at least one secondary object.

In one embodiment, it is conceivable that the at least one primary zone and/or a representation or illustration of this at least one primary zone only comprises or has the at least one primary object, whereas the at least one secondary object, usually a plurality of secondary objects, are located in the at least one secondary zone. In this regard, it is conceivable that a primary zone having the at least one primary object is or will be surrounded by at least one secondary zone having the at least one secondary object, wherein it is further conceivable that the at least one secondary, e.g. static, object forms a backdrop or background for the at least one primary object which moves relative to the at least one secondary object. It is also possible for there to be a plurality of primary objects spatially distributed in surroundings which are relevant to the driving situation. In this case, any object in the surroundings which is classified and/or recognized as dangerous for the driving situation and therefore particularly relevant is classified as a primary object.

When the surroundings are analyzed, it is alternatively or additionally possible for a trajectory of the vehicle in the specific driving situation and/or a kinematics or movement of at least one object in the surroundings to be predicted and compared to the trajectory of the vehicle. In this case, at least one object which is currently located on the trajectory of the vehicle and/or will be located on the trajectory of the vehicle according to a prediction is classified as the at least one primary object. In contrast, at least one other object, which is currently located next to or off the trajectory of the vehicle and/or is predicted to be located next to or off the trajectory, is classified as the at least one secondary object. In this case, it is possible for at least one kinematic parameter, i.e. a position, a speed and/or an acceleration of the objects in the surroundings of the vehicle, to be captured with the at least one exterior camera and/or a surroundings sensor, e.g. a distance sensor, of the vehicle and, in a further embodiment, to be predicted, for example, with a computing unit of the vehicle. In this case, it is also possible to take into account a relative change in at least one kinematic parameter of a particular object in the surroundings relative to the vehicle. A check is also made to establish whether the at least one object is in the way of the vehicle when the vehicle performs a driving maneuver in the specific driving situation.

If at least one object in the surroundings and/or at least one zone of the surroundings or a spatial region of the surroundings, usually at least the at least one primary object from a perspective and/or observation of the driver of the vehicle is obscured by at least one component of the vehicle, e.g. the display panel or a display or a monitor, an instrument panel and/or a hood as a possible component of the vehicle from a current viewing direction of the person, this at least one object is nevertheless depicted in an unobscured manner in a particular zone with the at least one display panel for the driver or a user of the vehicle. It is possible for the at least one display panel to show images captured by the at least one exterior camera of the surroundings, wherein covered zones of the surroundings are also displayed. This also applies to at least one object which is located in a so-called blind spot, wherein said at least one object, which cannot be seen directly from the perspective or line of sight of the driver, is alternatively depicted to the driver with, by and/or on the at least one display panel.

It is possible to use the at least one display panel to depict additional information from a driver assistance system, e.g. a navigation system and/or an entertainment system, and thus also optical effects. In this regard, it is provided that such additional information is only displayed in the at least one secondary zone and thus only depicted therein. In contrast, such additional information from the at least one primary zone having the at least one primary object is usually hidden. However, depending on the design of the method, it is also possible, as an alternative, to display at least one additional piece of information, usually at least one character and/or symbol, in the at least one primary zone of the display panel and thus to indicate at least one primary object or to explicitly draw attention thereto if, for example, it represents a danger and is particularly relevant. It is also possible to partially overlay the at least one primary object depicted in real form with the at least one additional piece of information. In one embodiment, such additional information is used to provide augmented and/or virtual reality.

Such additional information of the driver assistance system can also be designed or referred to as the content of a graphical user interface (GUI). At least one additional piece of information can be in the form of a character and/or symbol, e.g. a number, letter and/or pictogram, wherein a plurality of characters form a character string and thus, for example, text. Furthermore, an additional piece of information can also be designed as a static image, e.g. as a map, and/or a dynamic image, e.g. as a film or video, wherein such an image can in turn comprise at least one character and/or symbol, wherein the at least one additional piece of information can be dynamically changed, e.g. with regard to its size and/or color.

By displaying additional information in an image of the surroundings on the display panel, it is possible to provide the driver with additional support in a particular driving situation. If, for example, it is determined by sensors and/or based on the way the driver is operating the vehicle that a driving situation is particularly challenging and requires special attention from the driver, it is possible that irrelevant or non-driving-relevant additional information is hidden or not displayed at all, wherein the driver's attention is only drawn to objects relevant to a particular driving situation. Conversely, in the event that the driver is inattentive, for example has fallen asleep or is arguing with someone, which is also detected by sensors and/or on the basis of operation, it is also possible to draw the driver's attention to the display panel and the particular driving situation by means of acoustic warning signals and to further indicate this by displaying additional information, wherein it is also possible to overlay a relevant object depicted in real form with additional information and thus mark it and/or additionally visually highlight it with respect to an irrelevant object. This allows the driver to be alerted to urgent driving situations, such as emergency situations and/or hazards. By combining a particular display with acoustic warning signals, it is possible, among other things, to improve the driver's reaction time. In addition, the additional information displayed allows the driver to better focus and concentrate on the current driving situation and associated urgent tasks, such as braking and/or turning. If, on the other hand, the current driving situation is relaxed and the vehicle can drive autonomously or automatically in such a driving situation, tasks for controlling and thus steering the vehicle can be taken over and/or carried out by a driver assistance system designed for this purpose. In this case, it is possible to display additional information on the display panel for driver assistance and/or driver entertainment.

Typically, the depiction of the surroundings is set and/or adjusted as a function of the driving situation of the vehicle. This is possible, for example, when the vehicle is driving, wherein at least one kinematic parameter of the vehicle is also taken into account. Another possible driving situation for the vehicle is a parking maneuver and/or a parking operation, e.g. entering or exiting a parking space. In this case, a particular object in the surroundings which spatially delimits a parking space of the vehicle is to be classified as a primary object, wherein such a primary object is located in an extension of the trajectory and/or the path to be covered by the vehicle when performing the parking operation.

It is also possible for the driver, as a user of the vehicle, e.g. of his host vehicle, to define certain objects and/or kinematic parameters of certain objects that are relevant to specific driving situations. For this purpose, it is also possible to consider a list of such objects and kinematic parameters. As a rule, a living thing that normally moves on its own, e.g. a person and/or an animal and/or a further vehicle or another vehicle, is to be classified as a primary object and thus as relevant in a particular driving situation, in particular if it moves in the surroundings relative thereto and/or relative to the vehicle itself. In contrast, static objects in the surroundings, e.g. the roadway, buildings, vegetation, i.e. stationary living things, such as plants, but also the horizon, depending on the particular driving situation, are to be classified as secondary objects. However, during the parking operation, it is possible that a building and/or a further stationary vehicle bordering the parking space of the vehicle, i.e. the host vehicle, is also classified as a primary object. It is further provided that a traffic sign, e.g. a traffic light, is classified as a primary object if it concerns a portion of road along which the vehicle is moving and/or will move.

The depiction of the surroundings provided in the method makes it possible, among other things, for the driver to be actively informed of the at least one primary object as an object which is essential for the driving situation in contrast to the at least one secondary object, wherein it is possible for the driver to be able to concentrate or focus better on the at least one primary object without being distracted by the at least one secondary object.

The display system according to the present disclosure is designed to depict or display surroundings of a vehicle which is in a specific and/or current driving situation. The display system comprises as components at least one display panel or display of the vehicle, at least one exterior camera of the vehicle and at least one computing unit of the vehicle. The at least one exterior camera is usually arranged on an outer wall of the vehicle and is designed to optically capture the surroundings outside the vehicle in at least one spatial direction, i.e. forward, backward and/or sideways. The computing unit is designed to check whether or not at least one object in the captured surroundings is relevant and/or significant or important to the specific driving situation and, on the basis of this, to classify at least one object which is relevant to this driving situation as at least one primary object and, in contrast, at least one object which is irrelevant to this driving situation as at least one secondary object. In addition, the computing unit is designed to divide the surroundings and/or the at least one display panel into at least one primary spatial zone for the at least one primary object in which the at least one primary object is located, and at least one secondary spatial zone for the at least one secondary object in which the at least one secondary object is located, based on a classification of objects into the at least one primary object and the at least one secondary object. Usually, the computing unit is also designed to control at least one display panel on this basis. The at least one display panel is designed to depict the at least one primary zone and thus the at least one primary object in real form and to depict the at least one secondary zone and thus the at least one secondary object in modified or altered form and thus deviating from reality.

In one embodiment, the computing unit is designed to analyze original or real colors or a corresponding color spectrum of the surroundings and in particular of the at least one secondary zone comprising the at least one secondary object and, for example, to homogenize a gradient of the colors in the at least one secondary zone or a corresponding spatial region, wherein it is also possible to depict the at least one secondary zone on and/or with the at least one display panel with the homogeneous color gradient.

In addition, the display system has at least one interior camera for capturing an interior of the vehicle and thus the driver located therein and, among other things, also the driver's eyes. Accordingly, the at least one interior camera is also designed to detect a current viewing direction and/or perspective of the driver in the interior of the vehicle with respect to at least one object in the surroundings. The computing unit is designed to detect and/or determine at least one region of the surroundings which is obscured from the driver's current line of sight by at least one component of the vehicle. Furthermore, the at least one display panel is designed to display the at least one region obscured from the driver's current line of sight and thus a correspondingly obscured object in the surroundings, wherein the at least one display panel is controlled by the computing unit for this purpose.

The computing unit is usually also designed to recognize the specific and/or current driving situation based on at least one object in the surroundings and/or based on at least one kinematic operating parameter, which is usually detected by a sensor of the vehicle. It is also possible, taking into account a spatially and/or kinematically changing relationship of the vehicle to at least one object, to classify this at least one object as a primary object or as a secondary object.

It is possible that the at least one display panel is arranged in a forward direction of travel of the vehicle in front of a driver's seat and behind a windshield or front window of the vehicle in the interior of the vehicle.

It is possible to carry out an embodiment of the method according to the present disclosure with an embodiment of the display system according to the present disclosure, wherein an immersive display of the surroundings of the vehicle is provided. It is possible to fill at least one display panel, which is usually arranged in front of the driver's seat, with video images of the surroundings in front of the vehicle. In this case, the depiction of the surroundings and the objects therein is adjusted depending on an eye point and the direction of view of the driver. If the driver looks, for example, far ahead or around the vehicle while driving, the entire road and at least one primary object moving thereon will be depicted above the hood and/or a door panel, even though the road and/or this at least one primary object is covered by the hood or the door panel. Thus, the at least one component of the vehicle which otherwise prevents the driver from having a complete view of the surroundings is removed or hidden from the at least one display panel. The at least one component of the vehicle which otherwise obstructs the driver's view of the surroundings is usually hidden by video processing software executed by the computing unit and thus no longer displayed. This allows the driver to have a complete view of the surroundings directly in front of, next to and/or behind the vehicle. Furthermore, this video processing software is also suitable for dividing the surroundings into the at least one primary zone and the at least one secondary zone and accordingly depicting it partly in real form and partly in modified form, e.g. synthetically.

A real-time video of the surroundings of the vehicle with the at least one primary zone and the at least one secondary zone is depicted with, by and/or on the at least one display panel. Depending on the situation, it is also possible to supplement a particular depiction of the surroundings with virtual reality content as additional information. In addition to real traffic signs, which are usually classified as primary objects as a function of the driving situation, it is possible to display virtual traffic signs as additional information in the depiction of the surroundings. This applies, for example, to traffic signs, traffic lights, vehicle markings for the driver assistance system, lane markings for guidance of the vehicle's trajectory and/or operating instructions for the driver. In this case, however, it is taken into account that such virtual additional information may be displayed in the at least one secondary zone, but hidden from the at least one primary zone. The at least one display panel is also designed to display applications (apps), vehicle settings, movies and/or video games as additional information. The driver has no restricted visibility to the outside, in particular in relevant driving situations. This can improve overall comfort and safety.

The at least one interior camera or driver observation camera detects an eye point and/or the direction of view of the driver depending on a height of the driver as well as on a position and/or setting, e.g. inclination, of the seat on which the driver is sitting. The at least one interior camera and also the at least one exterior camera can have a plurality of lenses and/or focal points for an accurate or precise depiction of the surroundings or the driver. In this case, it is also possible for the at least one interior camera to take into account a change in the driver's viewing direction and/or viewing angle in the surroundings, wherein the viewing angle is determined, for example, in relation to the forward direction of travel or a longitudinal direction of the vehicle. In one embodiment of the method, the driver's viewing direction and/or perspective relative to the surroundings and the at least one object located therein, in particular the primary object, is/are taken into account, wherein at least one component of the vehicle between the driver's eyes and the at least one object covered by the at least one component is also taken into account.

The at least one exterior camera and/or internal camera is/are designed as a video camera or video cameras. In one embodiment, the display system comprises a plurality of exterior cameras with which the surroundings of the vehicle are redundantly captured at different levels, axes and/or focal points. In one embodiment, a depiction of the surroundings with the at least one display panel is adapted by a video processing unit in the computing unit or a control unit as a function of a relevance of objects to a particular driving situation and/or of components of the vehicle which may cover said objects.

It is possible that a networking architecture of the vehicle allows the computing unit to communicate with the video processing unit and a driver assistance unit which supports a situational display of additional information. It is also possible to use screen virtualization to display additional information from a human-machine interface in the at least one secondary zone, usually only in the at least one secondary zone.

It is possible for a display panel to be arranged below the windshield in front of the driver's seat, for example on an instrument panel, and to be designed to display a region of the surroundings below the windshield which would otherwise not be directly visible if, from the driver's perspective, this region is obscured by the at least one component of the vehicle. Such a display panel therefore serves as an extension of the windshield. The surroundings can still be fully depicted if at least one display panel covers the windshield from the current perspective of the driver and/or the driver's eyes and thus overlaps it.

In addition, any additional information is hidden from the at least one primary zone, wherein it is possible, for example, to reduce additional information which is scalable in multiple levels. Possible additional information can be variably colored and/or made transparent depending on the situation. A situational depiction or hiding of additional information is set as a function of the current driving situation and/or the workload of the vehicle. When a particular object is classified as a primary or secondary object as a function of the particular driving situation, associated driving tasks and the driver's attention required for the particular driving situation are also taken into account. The extent to which an object is classified as a primary or secondary object also depends on whether the current driving situation is challenging. This applies, for example, to changing lanes, overtaking and/or maneuvering and the resulting driving situation.

In one embodiment, it is possible to provide a plurality of layers in a secondary zone of the display panel, wherein in a first layer at least one secondary object in the surroundings is shown. This first layer is used as a background for an additional second layer in which additional information, e.g. for a graphical user interface, is displayed, which overlays the at least one secondary object in the secondary zone and thus depicts it in a correspondingly modified form.

Depending on the specific driving situation and the objects in the surroundings, it is possible to dynamically classify a particular object as a primary or secondary object and accordingly to dynamically set a particular zone of the surroundings and/or the display panel as a primary or secondary zone, wherein the trigger is a switching of the zone from a secondary zone to a primary zone or vice versa as a function of the driving situation, which also changes dynamically.

During a parking operation, the particular driving situation is recognized, for example, based on an engaged gear or shifting between two gears. In addition, navigation data from the vehicle's navigation system is taken into account to recognize a particular driving situation. This makes it possible to classify a roadway in the surroundings, for example, as a play street or a pedestrian walkway and also usually as a secondary object, whereas people moving in such surroundings are classified as primary objects.

In addition to the at least one exterior camera as a sensor for detecting vehicles and/or pedestrians in the surroundings, in a possible embodiment the display system also has additional sensors for detecting the surroundings. Such an additional sensor is designed, for example, as a parking sensor, such as a radar or lidar sensor, to detect another vehicle and/or a building in the vicinity of the vehicle entering or exiting a parking space. It is also possible to use additional sensors of the vehicle to determine its driving situation based on at least one kinematic parameter of the vehicle. In this case, it is possible to use an ABS or anti-lock braking system as a sensor, for example, to detect different levels of braking force and thus identify a corresponding driving situation. It is also possible to use a gyroscope as a sensor of the vehicle to determine its acceleration and the resulting driving situation.

It is also possible to consider radio-based or wireless communication of the vehicle with other objects in the surroundings, taking into account Car2X communication for communicating with other vehicles and/or a traffic infrastructure. In this case, it is possible to detect an accident ahead and determine the driving situation, wherein other vehicles involved in the accident are classified as primary objects. The driving situation can also be assessed based on the deployment of an emergency service and/or the formation of an emergency lane.

In addition, the driver's behavior can be taken into account to recognize a particular driving situation, wherein, among other things, the driver's cognitive load can be recognized based on his steering and/or operation of the vehicle. In this case, the driver's multitasking, among other things, is taken into account in order to recognize the driving situation. This is the case when the driver makes a phone call or operates an input device, e.g. an infotainment system, for a definable longer period of time while driving.

The display panel can be designed as a touch-sensitive display panel and thus as a touch display. In this case, it is possible for the driver to manually operate symbols to depict additional information. However, it is also possible in one embodiment of the method that if the driver classifies an object as particularly relevant to a particular driving situation, the driver touches said object on the display panel and classifies it as a relevant and thus primary object. It is also possible to learn, for example using artificial intelligence, that this object marked accordingly by the driver is trained as the primary object, which is possible depending on the current driving situation during which the driver has touched the object to be classified as primary.

It is also possible to use the vehicle's environmental sensors to detect environmental conditions in the surroundings or environment in which the vehicle is located or usually drives. This includes meteorological environmental parameters, i.e. the particular brightness or darkness of the surroundings, the humidity and the resulting wetness of a roadway being driven on, and the temperature in the surroundings and the resulting possible slipperiness of the roadway. It is also possible to detect any fog in the surroundings. In this case, objects which are influenced by such environmental parameters and thus also influence the driving situation are classified as primary objects.

It is understood that the features mentioned above and those still to be explained below can be used not only in the respectively specified combination but also in other combinations or alone without departing from the scope of the present disclosure.

The figures are described in relation to one another and as a whole. Identical components are denoted by the same reference signs. The first embodiment of the display system according to the present disclosure, shown schematically in FIGS. 1a and 1b, is designed for a vehicle 2, in this case for a motor vehicle, in which a driver 4 is seated who operates a steering wheel 64 while the vehicle 2 is moving and thereby steers the vehicle 2. As components, this display system has at least one interior camera 6, at least one exterior camera 8, which in this case is arranged by way of example on a front and thus on an outer wall of the vehicle 2, a computing unit 10 and a display panel 12, which in this case is arranged below a windshield 60 of the vehicle 2 and behind the steering wheel 64 with respect to a forward direction of travel of the vehicle 2. FIGS. 1a and 1b also schematically show an object 13 in a surroundings of the vehicle 2 in front of the vehicle 2.

In the first embodiment of the method according to the present disclosure, the surroundings and thus the object located therein are captured by the exterior camera 8. In addition, at least one eye 5 and a position of the eye 5 with respect to a vertical axis z and a longitudinal axis x of the vehicle 2 are captured using the at least one interior camera 6, wherein the longitudinal axis x is oriented parallel to the forward direction of travel of the vehicle 2. Furthermore, the at least one interior camera 6 captures a viewing angle $\alpha'$ (FIG. 1a) or $\alpha''$ (FIG. 1b) with respect to the longitudinal axis.

In the first embodiment of the method, the computing unit 10 monitors the current driving situation in which the vehicle 2 is currently located. In addition, the computing unit 10 checks whether a particular object 13 in the surroundings is particularly relevant or of particular importance for the particular driving situation because it is currently influencing the particular driving situation and/or will influence the particular driving situation according to a prediction by the computing unit 10. Such an object 13 which is relevant to the driving situation is classified as a primary object in the method. Other objects in the surroundings that are less relevant or not at all relevant to the driving situation are classified as secondary objects. Based on this, a particular relevant object 13 is displayed to the driver 4 with, by and/or on the display panel 12 in a primary zone in real form. In contrast, other objects in at least one secondary zone are depicted with, by and/or on the display panel 12 in modified, distorted, e.g. simplified, abstracted and/or discolored form, in contrast to reality, wherein the at least one primary object 13 is visually different from the secondary objects in the surroundings for the driver 4 and is thus clearly highlighted.

In addition, in the first embodiment of the method, it is possible for a particular object 13, usually also independent of its relevance to the driving situation, to be additionally depicted with, by and/or on the display panel 12 if, from a particular viewing angle $\alpha'$, $\alpha''$ of the driver 4, it should currently be covered by a component of the vehicle 2, for example by a hood 62, wherein this object 13 is nevertheless made visible to the driver 4.

The second embodiment of the system according to the present disclosure for carrying out a second embodiment of the method according to the present disclosure is intended for a vehicle. FIG. 2a, 2b, 2c, 2d, 2e each show an inner wall 14 of the vehicle, which delimits an interior of the vehicle in front of a seat of a driver of the vehicle. The vehicle has a windshield 16 or front window, which in this case is arranged between two pillars 18, usually A-pillars, and is delimited thereby. A steering wheel 20 of the vehicle is also shown here. The vehicle also comprises an instrument panel and/or a dashboard, which is also integrated into the inner wall 14 or forms the inner wall 14. In this case, the second embodiment of the display system comprises a display panel 22 which is arranged in front of a driver's seat on the inner wall 14 in a forward direction of travel of the vehicle in front of the steering wheel 20 and below the windshield 16.

Figure 2:
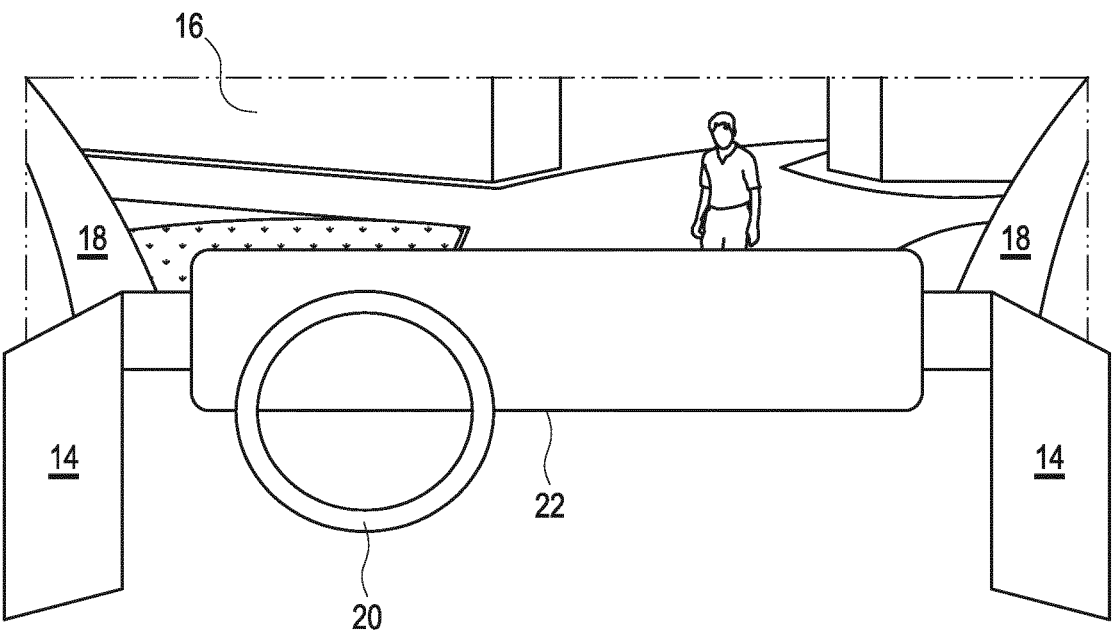
FIG. 2 is a schematic view of a second embodiment of the display system according to the present disclosure for carrying out a second embodiment of the method according to the present disclosure.
Figure 2:
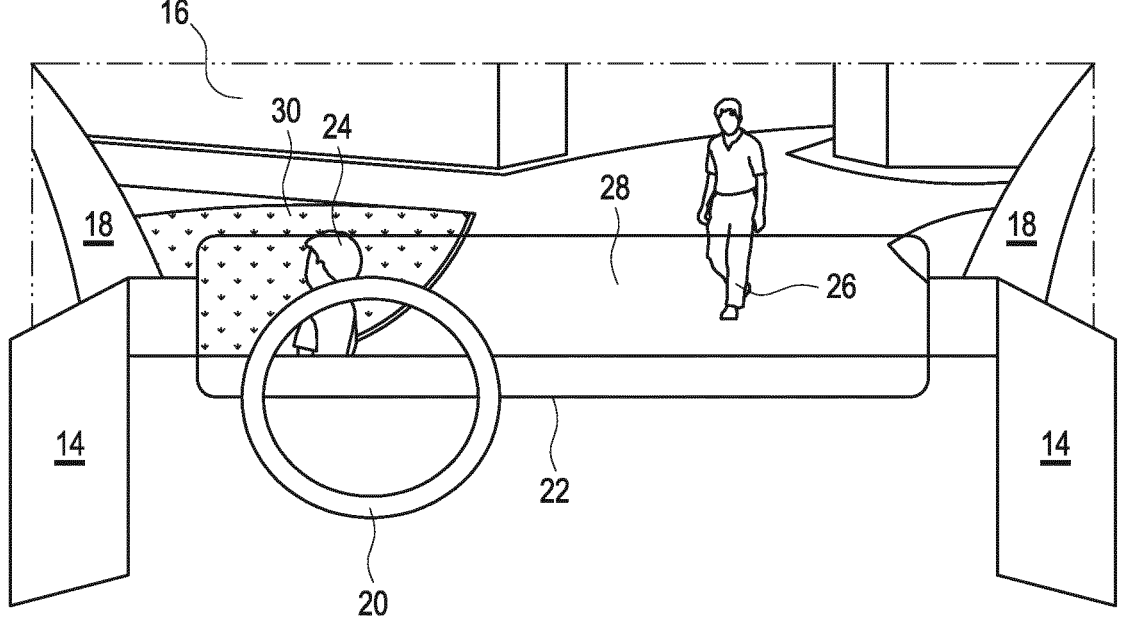
Figure 2:
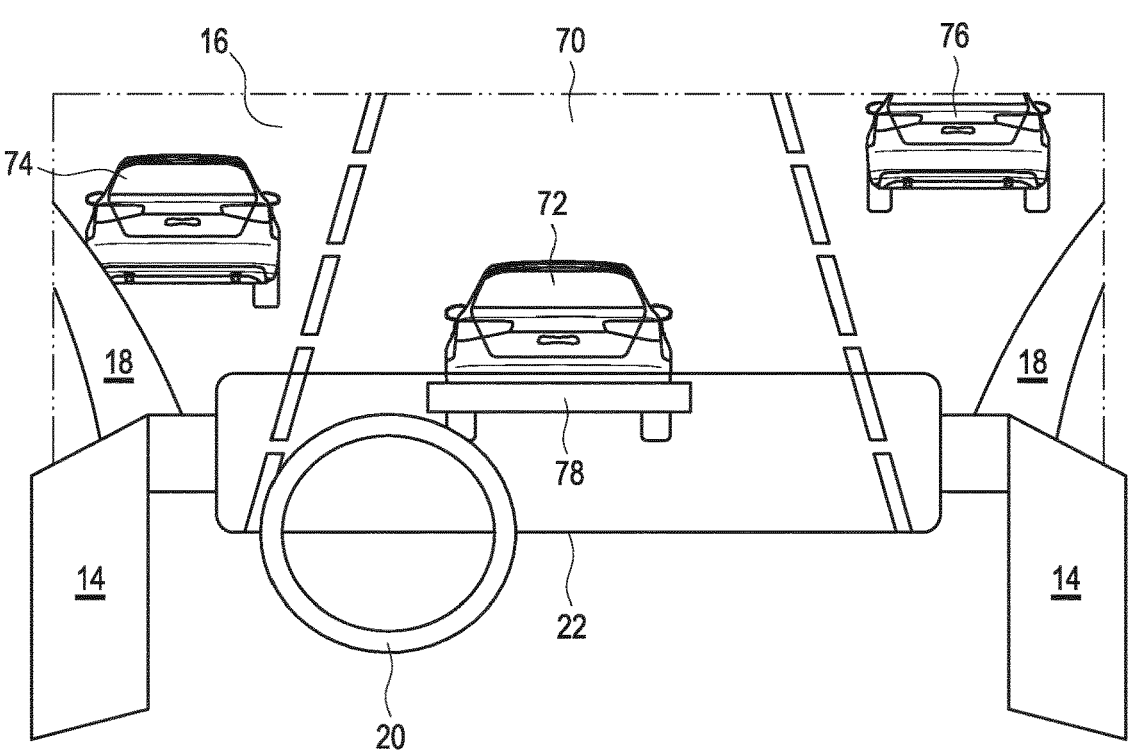
Figure 2:
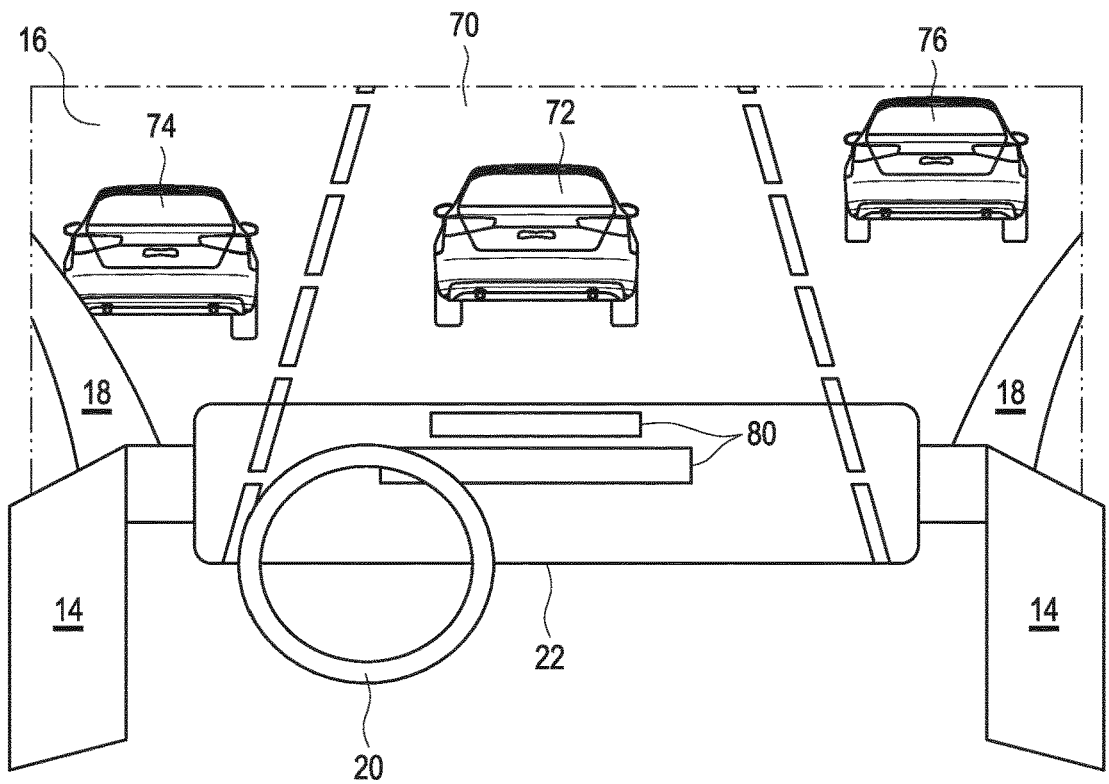
Figure 2:
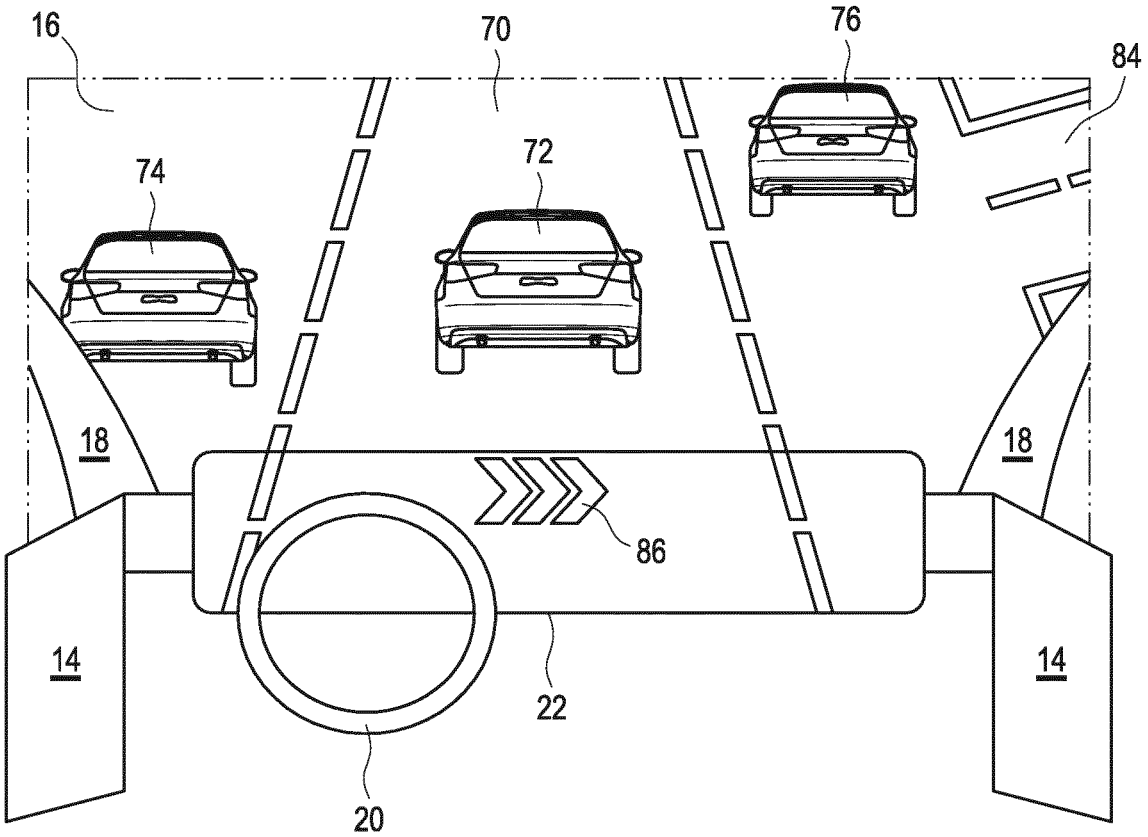

FIG. 2a shows that the display panel 22 is switched off. In contrast, in a first variant of the second embodiment of the method according to the present disclosure, the display panel 22 is switched on, as shown in FIG. 2b. In this embodiment of the method, objects in the surroundings of the vehicle are classified with regard to their relevance to a current, usually determined, driving situation of the vehicle. In this case, reference is made to a child as the primary object 24, at least one leg of a person as another primary object 26, as well as to a roadway on which the vehicle is traveling as a secondary object 28, and a planted area as another secondary object 30 bordering the sides of the roadway.

When making a distinction between primary objects 24, 26 and secondary objects 28, 30 in the surroundings of the vehicle as provided for in the method, it is taken into account that the primary objects 24, 26 influence the driving situation currently and/or in the future according to a prediction, whereas the secondary objects 28, 30 are not relevant to the driving situation, at least not currently. In this case, it is provided that the primary objects 24, 26 move within the surroundings relative to the secondary objects 28, 30. When the surroundings are depicted with, by and/or on the display panel 22, it is provided that primary objects 24, 26 are optically highlighted compared to secondary objects 28, 30. In this case, the primary objects 24, 26 are depicted in real form. In contrast, the secondary objects 28, 30 are depicted in an optically changed manner.

A comparison of the two FIGS. 2a and 2b illustrates a further aspect of the second embodiment of the method. In this case, it should be considered that the primary objects 24, 26 cannot be seen from a viewing angle and/or a viewing direction or perspective of the driver through the windshield 16 because these primary objects 24, 26, but also the secondary objects 28, 30, are covered by at least one component of the vehicle, wherein the at least one component of the vehicle prevents the driver from seeing these objects 24, 26, 28, 30. However, in the second embodiment of the method, the aforementioned objects 24, 26, 28, 30, which are otherwise not visible but are recorded and thus detected by the at least one exterior camera of the vehicle, are depicted using the display panel 22 in a way that is clearly visible to the driver.

In a second variant of the second embodiment of the method according to the present disclosure, which is illustrated with reference to FIGS. 2c, 2d and 2e, the vehicle or host vehicle for which the surroundings are depicted in the method drives on a three-lane roadway, in this case the main roadway, as a secondary object 70. A plurality of vehicles or other vehicles are driving on the roadway in front of this host vehicle as primary objects 72, 74, 76, namely a first other vehicle as the first primary object 72, which, like the host vehicle, is located in a middle lane and is driving directly in front of it. Another vehicle, as a secondary object 74, 76, drives in a left lane and a right lane of the roadway in front of the host vehicle.

In the illustration of a particular driving situation of the host vehicle with reference FIGS. 2c, 2d and 2e, it is apparent that the first other vehicle is actually shown as the primary object 72 in FIG. 2c in a primary zone on the display panel 22. In FIGS. 2d and 2e it is directly visible through the windshield 16. In this case, the two other vehicles as primary objects 74, 76 are directly visible through the windshield 16 as the window of the host vehicle. In this case, it is also possible that another vehicle is at least partially directly visible through at least one window pane of the vehicle, i.e. through the windshield and/or through a side window.

In a first driving situation (FIG. 2c), it is provided that a distance between the host vehicle and the first other vehicle in the middle lane is smaller than a threshold value provided for this purpose, which is why a red bar and/or stripe is displayed as a symbol 78 and thus as additional information in the display panel 22, wherein this symbol partially overlays or covers the actually displayed first other vehicle, even though it is or has been classified as the primary object 72. In this case, this symbol 78 is used as additional information to indicate that the first other vehicle is and/or will be particularly relevant, possibly dangerous, for the driving situation of the host vehicle and is therefore marked with the additional information.

In a second driving situation (FIG. 2d), it is provided that the distance between the host vehicle and the first other vehicle in the middle lane is greater than a threshold value provided for this purpose, which is why two parallel orange bars and/or stripes of different lengths are displayed in the display panel 22 as symbols 80 and thus as additional information. In a third driving situation (FIG. 2e), it is provided that the host vehicle approaches a roadway designed as a side road which branches off to the right from the main roadway and is further classified as a secondary object 84. In this case, a plurality of arrowheads are displayed in the display panel 22 as symbols 86 and thus as additional information, which arrowheads indicate the side road and the possibility of driving thereon it after leaving the main roadway.

Figure 3:
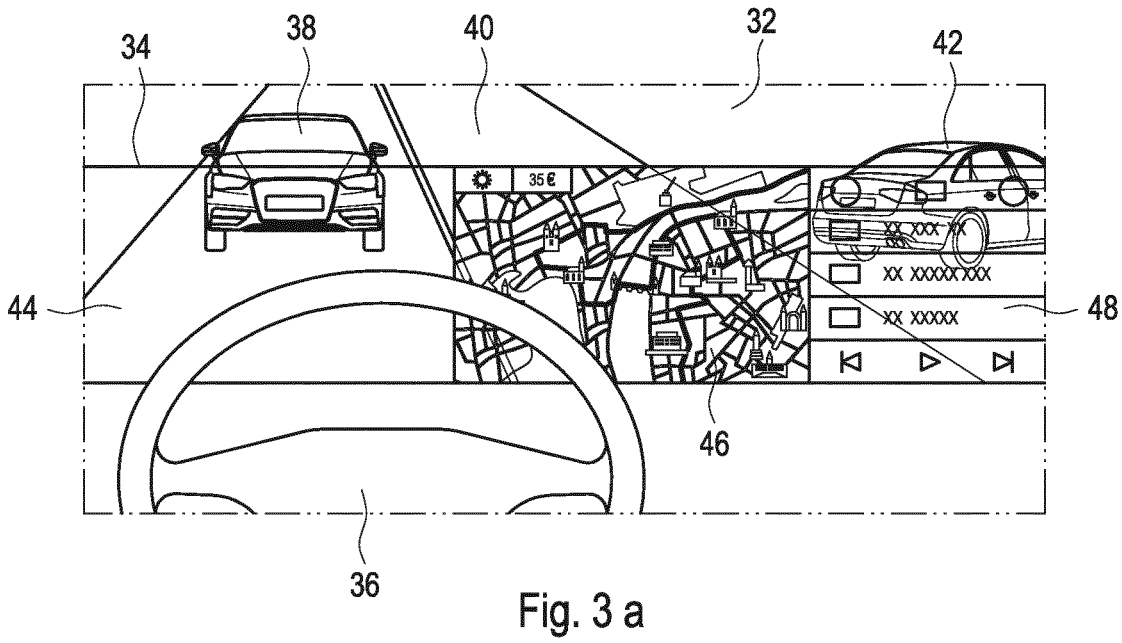
FIG. 3 is a schematic view of a third embodiment of the display system according to the present disclosure for carrying out a third embodiment of the method according to the present disclosure.
Figure 3:
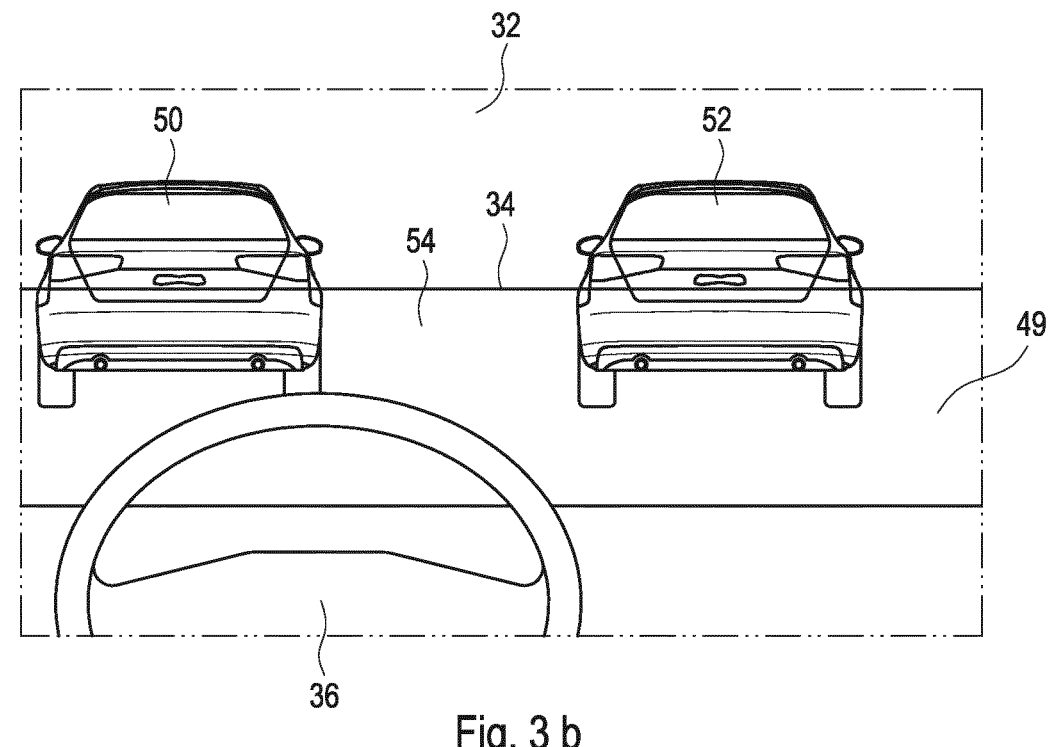

The third embodiment of the display system according to the present disclosure for carrying out the third embodiment of the method according to the present disclosure is shown schematically in FIGS. 3a and 3b. FIGS. 3a and 3b show, from the perspective of a driver's seat of a vehicle designed or to be referred to here as a host vehicle, a windshield 32 and a steering wheel 36, between which a display panel 34 is arranged as a component of the embodiment of the display system. In this case, it is provided that this display panel 34 partially overlaps at least a lower portion of the windshield 32. It is possible to make this display panel 34 transparent at least in portions, wherein the surroundings in front of the vehicle, in this case the surroundings in front of the host vehicle, are visible through the display panel 34. However, it is also possible to display additional display content in the display panel 34 and thereby at least partially, or if necessary even completely, overlay the surroundings.

In the embodiment of the method, it is provided that the surroundings are recorded by at least one exterior camera on an external wall of the vehicle and are thus optically captured. In addition, images of the surroundings taken by at least one exterior camera are analyzed by a computing unit of the display system. For this purpose, the current driving situation and thus a specific driving situation of the vehicle itself is taken into account by the computing unit.

In a first driving situation (FIG. 3a), the computing unit classifies a road on which the host vehicle is driving as a secondary object 40. In addition, a vehicle in the surroundings, in this case a second other vehicle, which is standing motionless next to the roadway, is also classified as secondary object 42. In contrast, another vehicle in the surroundings, in this case a first other vehicle, which is moving on the roadway relative thereto, is classified as a primary object 38 in the surroundings.

In the method, the first other vehicle is depicted as a primary object 38 in a primary zone 44 of the display panel 34 in real and unadulterated form, wherein it is provided here that the primary zone 44 is or will be made transparent, and said first other vehicle is thus directly recognizable through the display panel 34. In contrast to this, the secondary objects 40, 42 in secondary zones 46, 48 are depicted on or with the display panel 34 in modified form compared to reality and thus distorted accordingly, wherein in this case in a first secondary zone 46, in which the road is located as the first secondary object 40, a map of a navigation system is displayed as additional information. In addition, in a second secondary zone 48, an infotainment system of the host vehicle is displayed as additional information, which infotainment system overlays the second other vehicle as a second secondary object 42 and thus optically modifies it.

The method takes into account the fact that the primary object 38, i.e. the driving first other vehicle, is relevant to the driving situation of the host vehicle. In contrast, the secondary objects 40, 42, which are motionless in the surroundings, are not relevant to the driving situation. If another vehicle appears in the surroundings in front of the host vehicle while it is driving and is coming towards the host vehicle or driving in front of it, it is possible that this other vehicle will also be classified as a primary object. In this case, a zone in which this other moving vehicle is located is depicted in real form, wherein additional information which initially covered such a secondary zone is hidden from this now primary zone, wherein this initially secondary zone is now converted to a primary zone. As FIG. 3*b* illustrates, in a second driving situation of the host vehicle, two vehicles, which can be referred to as other vehicles and are classified here as primary objects 50, 52, are driving in the surroundings of the host vehicle directly on a road and thus on a roadway as a secondary object 49. In this second driving situation, additional information which can otherwise be depicted is completely hidden from the display panel 34, wherein in this case a primary zone 54 having these two primary objects 50, 52 is depicted in real form, wherein the display panel 34 is made transparent or translucent in this primary zone 54, wherein these two primary objects 50, 52, which are relevant to the second driving situation of the host vehicle, are depicted in completely real form through the windshield 32 and also through the display panel 34.

It is possible that another vehicle on a road used by the host vehicle, for example at the end of a traffic jam ahead, is identified as the primary object when the host vehicle approaches it, even though it is stationary. In one embodiment, any motionless object can be classified as a primary object if the vehicle approaching it has a definable minimum distance thereto, taking into account its trajectory.

REFERENCE SIGNS

2 Vehicle
4 Driver
5 Eye
6 Interior camera
8 Exterior camera
10 Computing unit
12 Display panel
13 Object
14 Interior wall
16 Windshield
18 Pillar
20 Steering wheel
22 Display panel

14

24, 26 Primary object
28, 30 Secondary object
32 Windshield
34 Display panel
36 Steering wheel
38 Primary object
40, 42 Secondary object
44 Primary zone
46, 48 Secondary zone
49 Secondary object
50, 52 Primary object
54 Primary zone
60 Windshield
62 Hood
64 Steering wheel
70 Secondary object
72, 74 Primary object
76 Primary object
78, 80 Symbol
84 Secondary object
86 Symbol
$\alpha'$, $\alpha''$ Viewing angle
X Longitudinal axis
Z Vertical axis

The invention claimed is:

1. A method for depicting surroundings of a vehicle, on at least one display panel of the vehicle, the vehicle being in a specific driving situation, the method comprising:
  capturing the surroundings of the vehicle by at least one exterior camera of the vehicle;
  checking to establish whether or not at least one object in the surroundings of the vehicle is relevant to the specific driving situation;
  classifying the at least one object that is relevant to the specific driving situation as at least one primary object;
  classifying the at least one object that is irrelevant to the specific driving situation, as at least one secondary object;
  displaying the at least one primary object in at least one primary zone of the display panel, wherein the at least one primary zone is depicted in a real form;
  displaying the at least one secondary object in at least one secondary zone of the display panel, wherein the at least one secondary zone is depicted in a modified form;
  predicting a trajectory of the vehicle in the specific driving situation and predicting a movement of the at least one object based on analyzing the surroundings of the vehicle; and
  comparing the predicted movement of the at least one object to the trajectory of the vehicle, wherein the at least one object located on the trajectory of the vehicle is characterized as the at least one primary object, and wherein the at least one object located next to the trajectory of the vehicle is characterized as the at least one secondary object.

2. The method according to claim 1, further comprising:
  displaying the at least one primary zone in an optically sharp and/or clear manner; and
  displaying the at least one secondary zone in an optically fuzzy, unclear and/or blurred manner.

3. The method according to claim 1, further comprising:
  displaying the at least one primary zone in true colors; and
  displaying colors of the at least one secondary zone in an optically modified manner.

4. The method according to claim 1, further comprising:

classifying at least one dynamic object as the at least one primary object; and classifying at least one static object as the at least one secondary object.

5. The method according to claim 1, further comprising depicting on the at least one display panel, at least one object which is hidden by at least one component of the vehicle from a viewing direction of a driver of the vehicle.

6. The method according to claim 1, further comprising displaying additional information of a driver assistance system in the at least one secondary zone and/or hiding the additional information of the driver assistance system from the at least one primary zone.

7. A display system for depicting surroundings of a vehicle in a specific driving situation, the display system comprising:

at least one display panel of the vehicle;

at least one exterior camera of the vehicle configured to capture the surroundings of the vehicle; and at least one computing unit configured to:

check to establish whether or not at least one object in the surroundings of the vehicle is relevant to the specific driving situation;

classify the at least one object that is relevant to the specific driving situation as at least one primary object;

classify the at least one object that is irrelevant to the specific driving situation, as at least one secondary object;

display the at least one primary object in at least one primary zone of the display panel, wherein the at least one primary zone is depicted in a real form; and display the at least one secondary object in at least one secondary zone of the display panel, wherein the at least one secondary zone is depicted in a modified form;

predict a trajectory of the vehicle in the specific driving situation and predict a movement of the at least one object based on analyzing the surroundings of the vehicle; and compare the predicted movement of the at least one object to the trajectory of the vehicle, wherein the at least one object located on the trajectory of the vehicle is characterized as the at least one primary object, and wherein the at least one object located next to the trajectory of the vehicle is characterized as the at least one secondary object.

8. The display system according to claim 7, wherein the display system comprises at least one interior camera configured to detect a current viewing direction of a person in an interior of the vehicle.

9. The display system according to claim 8, wherein the computing unit is further configured to detect at least one region of the surroundings of the vehicle hidden from the current viewing direction of the person by at least one component of the vehicle.

10. The display system according to claim 9, wherein the at least one display panel is configured to depict the at least one region of the surroundings of the vehicle hidden from the current viewing direction of the person.

11. The display system according to claim 7, wherein the at least one computing unit is further configured to recognize the specific driving situation based on the at least one object in the surroundings of the vehicle and/or based on at least one kinematic operating parameter of the vehicle.

*    *    *    *    *